United States Patent [19]

Hayashi

[11] Patent Number: 5,239,546
[45] Date of Patent: Aug. 24, 1993

[54] DATA MULTIPLEXING DEVICE
[75] Inventor: Mishio Hayashi, Saitama, Japan
[73] Assignee: Advantest Corporation, Tokyo, Japan
[21] Appl. No.: 631,856
[22] Filed: Dec. 21, 1990
[30] Foreign Application Priority Data Dec. 28, 1989 [JP] Japan .................................. 1-340388

[51] Int. Cl.[5] ............................. H04J 3/04; H04J 4/00
[52] U.S. Cl. .................................... 370/112; 370/50
[58] Field of Search ............... 370/112, 50, 94.1, 85.1; 307/243; 328/104, 154; 375/78, 37

[56] References Cited

U.S. PATENT DOCUMENTS

| | | | |
|---|---|---|---|
| 3,995,119 | 11/1976 | Pachynski, Jr. | 370/112 |
| 4,271,499 | 6/1981 | Leveque | 370/94.1 |
| 4,837,763 | 6/1989 | Sasaki | 307/243 |
| 4,926,423 | 5/1990 | Zukowski | 328/104 |
| 4,939,722 | 7/1990 | Beichler | 370/112 |

*Primary Examiner*—Curtis Kuntz
*Assistant Examiner*—Vijay Shankar
*Attorney, Agent, or Firm*—Staas & Halsey

[57] ABSTRACT

In a high-speed data multiplexing device with a plurality of data multiplexing circuits there are included in each data multiplexing circuit a frequency divider for frequency dividing the same clock and a logic circuit for time division multiplexing input data of a plurality of channels in accordance with the output of the frequency divider. The outputs of the frequency dividers are subjected to a logical operation by a gate circuit. A voltage corresponding to the duty ratio of the operated output from the gate circuit is compared with a reference voltage in a detector/controller section. It is determined, based on the result of comparison, whether or not the frequency dividing phases of the frequency dividers of the data multiplexing circuits are uniform, and if not, a reset signal is applied to the frequency dividers to reset them to thereby make their frequency dividing phases uniform.

8 Claims, 8 Drawing Sheets

FIG. 9A CASE 1

FIG. 9B CASE 2

FIG. 9C CASE 3

FIG. 10

DATA MULTIPLEXING DEVICE

BACKGROUND OF THE INVENTION

The present invention relates to a data multiplexing device for multiplexing pattern data or similar data.

Figure 1:
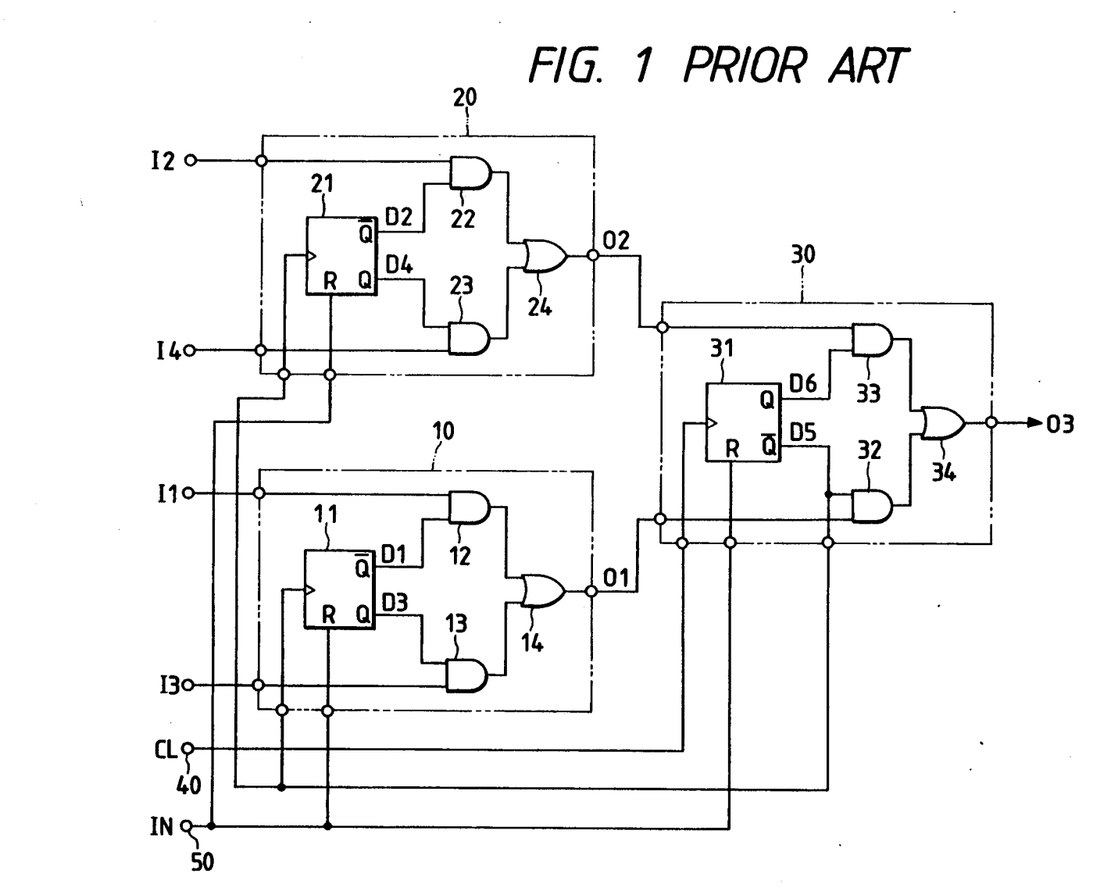
FIG. 1 is a circuit diagram showing a conventional data multiplexing device.

A data multiplexing device is usually employed for generating pattern data at a rate as high as 3 giga bits, for instance. FIG. 1 shows an example of a conventional data multiplexing device, which includes two front-stage data multiplexing circuits 10 and 20 and one back-stage data multiplexing circuit 30.

The data multiplexing circuits 10, 20 and 30 are multiplexers for multiplexing input 2-channel input data on a time-shared basis and they have frequency dividers 11, 21 and 31, respectively. The frequency dividers 11, 21 and 31 are ½ frequency dividers, each formed by a T flip-flop, for example. The frequency divider 31 frequency divides a clock CL available at a terminal 40, and the frequency dividers 11 and 21 both frequency divide an output D5 of the frequency divider 31.

In the data multiplexing circuit 10 input pattern data I1 and an output D1 of the frequency divider 11 are supplied to an AND gate 12, input pattern data I3 and the other output D3 of the frequency divider 11 are supplied to an AND gate 13, and the outputs of the AND gates 12 and 13 are provided to an OR gate 14. In the data multiplexing circuit 20 input pattern data I2 and an output D2 of the frequency divider 21 are applied to an AND gate 22, input pattern data I4 and the other output D4 of the frequency divider 21 are applied to an AND gate 23, and the outputs of the AND gates 22 and 23 are provided to an OR gate 24. In the data multiplexing circuit 30 output pattern data O1 of the data multiplexing circuit 10 and the output D5 of the frequency divider 31 are applied to an AND gate 32, output pattern data O2 of the data multiplexing circuit 20 and the other output D6 of the frequency divider 31 are applied to an AND gate 33, and the outputs of the AND gates 32 and 33 are provided to an OR gate 34.

The input pattern data I1, I2, I3 and I4 each have a NRZ waveform of a rate ¼ of the clock CL (i.e. a period four times that of the clock CL). At the start of the system an initial reset signal IN is applied from a terminal 50 to the frequency dividers 11, 21 and 31 to rest them.

Figure 2:
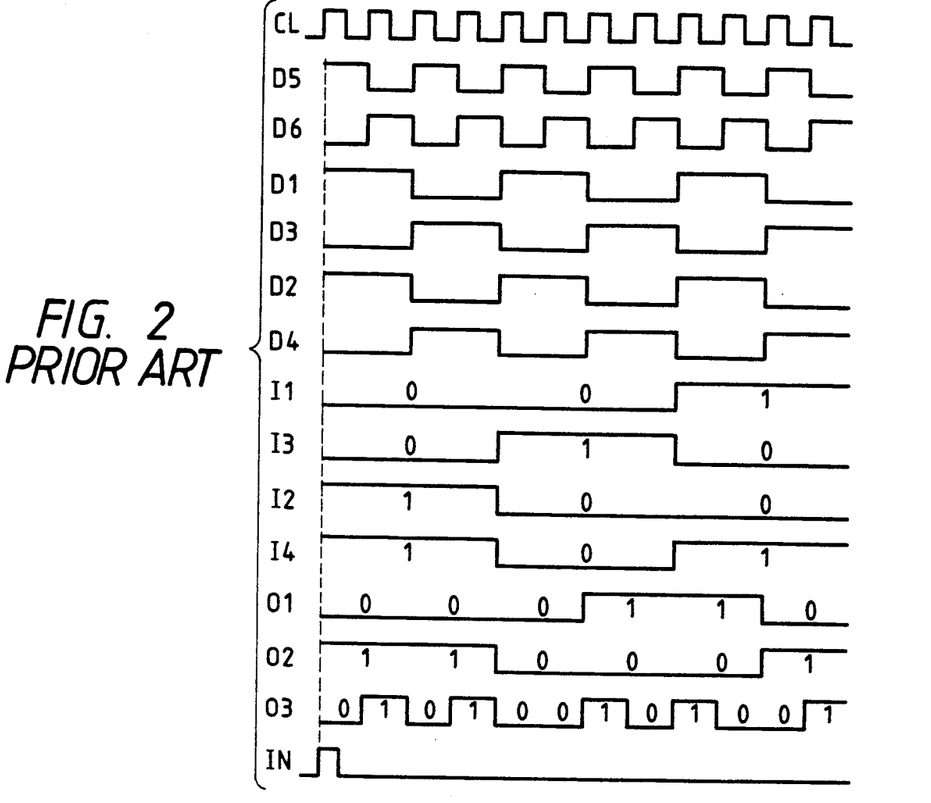
FIG. 2 is a timing chart for explaining a normal operation of the multiplexing device shown in FIG. 1.

Consequently, the clock CL, the outputs D5 and D6 of the frequency divider 31, the outputs D1 and D3 of the frequency divider 11, the outputs D2 and D4 of the frequency divider 21, the input pattern data I1, I3, I2 and I4, the output pattern data O1 and O2 of the data multiplexing circuits 10 and 20, final output pattern data O3 available from the data multiplexing circuit 30 and the initial reset signal IN bear such relations as shown in FIG. 2. The input pattern data I1 through I4 are time division multiplexed in the order I1-I2-I3-I4-I1-I2-..., providing the output pattern data O3.

In the conventional data multiplexing device in which the frequency dividers 11 and 21 operate concurrently, it is necessary, for varying the frequency of the clock CL over a wide band, to switch the frequency range of the clock CL or switch an output amplifier in accordance with the frequency range. This may sometimes produce in the clock CL pulses P1 and P2 of widths smaller than a predetermined value, resulting in the production of a narrow pulse P3 in the output D5 of the frequency divider 31 as exemplified in FIG. 3. Alternatively, clock pulse or pulses may drop out. In the case where the source of the clock CL is an external unit which is connected to the data multiplexer, a similar unwanted phenomenon occurs when the connection is unstable.

Figure 3:
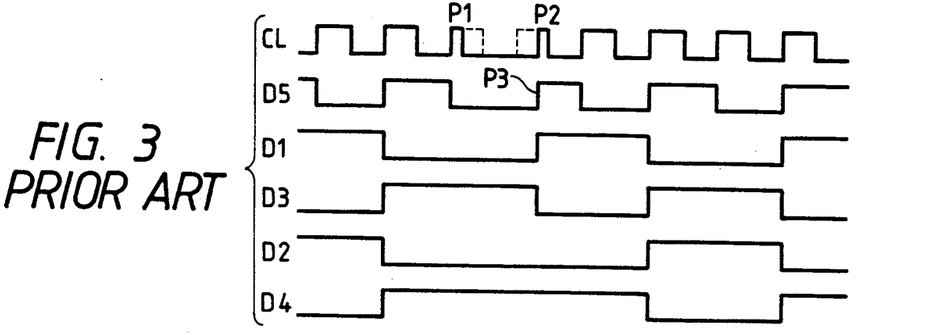
FIG. 3 is a timing chart for explaining an abnormal operation of the multiplexing device depicted in FIG. 1.

In such a conventional data multiplexing device designed so that the frequency dividers 11 and 21 operate concurrently, if the frequency dividers 11 and 21 differ in response speed, for example, fi the frequency divider 21 is slower in response than the frequency divider 21, when the narrow pulse P3 occurs in the output D5 of the frequency divider 31 which serves as a clock for the frequency dividers 11 and 21 as mentioned above, the frequency divider 11 will respond to the narrow pulse P3 but the frequency divider 21 will not respond. In such an instance, the outputs D1 and D2 of the frequency dividers 11 and 21 and the outputs D3 and D4 of the frequency dividers 11 and 21 will differ from each other as depicted in FIG. 3. This state lasts even after the clock CL becomes normal again and consequently the output D5 of the frequency divider 31 returns to its normal state. Hence, the order of multiplexing of the input pattern data I1 through I4 in the final output pattern data O3 available from the data multiplexing circuit 30 becomes different from the predetermined order after the occurrence of an abnormality in the clock CL.

In the prior art, when such abnormalities as mentioned above occur in the clock CL and in the outputs D5 and D6 of the frequency divider 31 and the order of multiplexing of the input pattern data I1 to I4 in the output pattern data O3 become different from the predetermined order due to the difference in response between the frequency dividers 11 and 21, a reset signal is supplied, by an artificial operation, from the terminal 50 to the frequency dividers 11, 21 and 31 to reset them, thus correcting the order of multiplexing of the input pattern data I1 through I4 to the predetermined order.

However, the restoration of normal operation by such an artificial operation is troublesome. Besides, according to the cause of the abnormality in the clock CL, there is a case where it cannot be recognized that the order of multiplexing of the input pattern data has become different from the predetermined order, and in such a case, the order of multiplexing cannot be corrected.

SUMMARY OF THE INVENTION

It is therefore an object of the present invention to provide a data multiplexing device which is simple-structured but is capable of automatically detecting a change in the multiplexing order of input data due to nonuniformity in frequency dividing phases of the frequency dividers between the data multiplexing circuits and is automatically correcting the frequency dividing phases of the frequency dividers to multiplex the input data in a predetermined order.

The data multiplexing device of the present invention includes, for the plurality of data multiplexing circuits, a gate circuit for ORing or ANDing the outputs of the concurrently operating frequency dividers of the data multiplexing circuits, and a detector/controller section by which it is determined whether the duty ratio of the output of the gate circuit has a predetermined duty value or whether it has deviated from the predetermined ratio in a predetermined direction and, when the duty ratio has deviated in the predetermined direction, the frequency dividers of the data multiplexing circuits are reset.

When the frequency dividers of the data multiplexing circuits are uniform in frequency dividing phase, the OR or AND of the non-inverted or inverted logic outputs of the respective frequency dividers has a duty ratio of 50%. When there is lack of uniformity in the frequency dividing phases of the frequency dividers, the duty ratio of the OR or AND becomes greater or smaller than 50% and the direction of this deviation is fixed. In the case where two data multiplexing circuits have frequency dividers for frequency dividing the same clock and the frequency dividers are uniform in their frequency dividing phases, the OR or AND of non-inverted or inverted logic outputs of a duty ratio of 100 or 0%. When the frequency dividers are nonuniform in frequency dividing phase, the duty ratio of the OR or AND of their output deviates from the predetermined value in a predetermined direction; for example, the duty ratio becomes smaller than 100% in the case of the OR and greater than 0% in the case of the AND.

Thus, in the data multiplexing device of the above construction according to the present invention the gate circuit performs a logic operation based on the OR or AND of the outputs of the parallel-operating frequency dividers and the detector/controller section detects a change in the duty ratio of the logic operation output. This ensures the detection of nonuniformity in the frequency dividing phases of the frequency dividers between the respective data multiplexing circuits. Further, the detected output is used to reset the frequency dividers, by which their frequency dividing phases are atomically corrected so that the order of multiplexing of input data becomes as predetermined.

DESCRIPTION OF THE PREFERRED EMBODIMENTS

Figure 4:
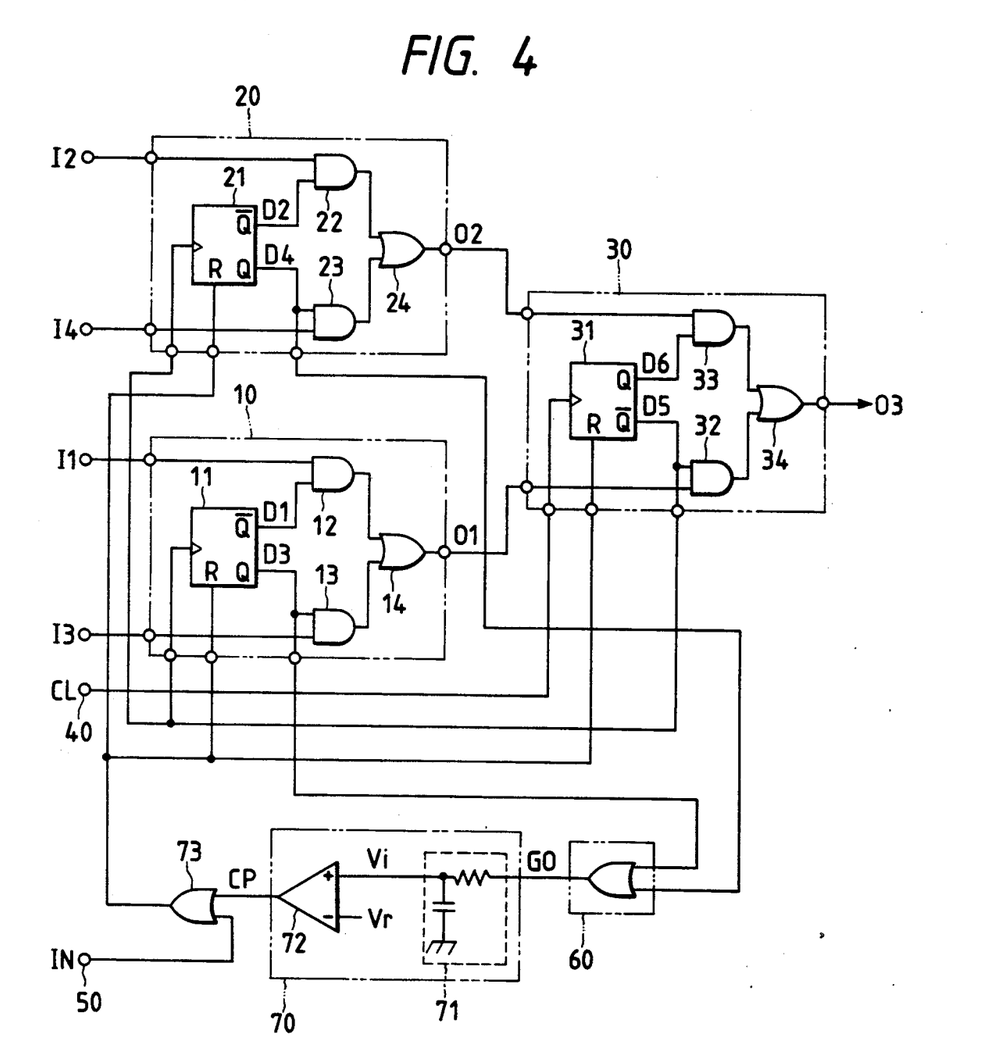
FIG. 4 is a circuit diagram illustrating an example of the data multiplexing device of the present invention.

FIG. 4 illustrates an embodiment of the data multiplexing device of the present invention.

As is the case with the conventional data multiplexing device depicted in FIG. 1, this embodiment includes two front-stage data multiplexing circuits 10 and 20 and one back-stage data multiplexing circuit 30, which are multiplexers each for multiplexing two-channel input data on a time-shared basis and have frequency dividers 11, 21 and 31 formed as individual semiconductor IC's, respectively. The frequency dividers 11, 21 and 31 are ½ frequency dividers, each formed by a T flip-flop, for instance. The frequency divider 31 frequency divides the clock CL available at the terminal 40 and the frequency dividers 21 and 31 both frequency divide the output D5 of the frequency divider 31. The data multiplexing circuit 10 is supplied with the input pattern data I1 and I3, the data multiplexing circuit 20 is supplied with the input pattern data I2 and I4, and the data multiplexing circuit 30 is supplied with the output pattern data O1 and O2 of the data multiplexing circuits 10 and 20. The input pattern data I1, I3, I2 and I4 are each a NRZ waveform of a rate ¼ that of the clock CL. At the start of this multiplexer the initial reset signal IN is applied from the terminal 50 to the frequency dividers 11, 21 and 31 to reset them. The above-mentioned construction is the same as that of the conventional data multiplexing device shown in FIG. 1. In this embodiment, however, the initial reset signal IN is supplied via an OR gate 73 to the frequency dividers 11, 21 and 31.

Figure 5:
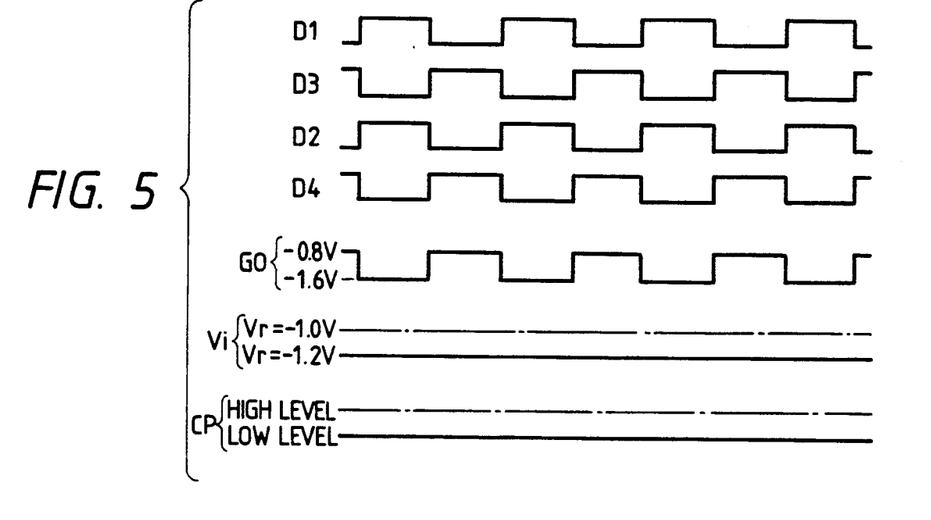
FIG. 5 is a timing chart for explaining a normal operation of the multiplexing device shown in FIG. 4.

When the clock CL is normal and the frequency dividers 11 and 21 are uniform in their frequency dividing phases, the clock CL, the outputs D5 and D6 of the frequency divider 31, the outputs D1 and D3 of the frequency divider 21, the input pattern data I1, I3, I2 and I4, the output pattern data O1 and O2 of the data multiplexing circuits 10 and 20, the final output pattern data O3 of the data multiplexing circuit 30, and the initial reset signal IN bear such relations as shown in FIG. 5. The input pattern data I1 through I4 are time division multiplexed in the order I1-I2-I3-I4-I1-I2- . . . , providing the final output pattern data O3.

The data multiplexing device of the present invention further includes a gate circuit 60 and a detector/controller section 70. The gate circuit 60 is, in this embodiment, an OR gate for ORing the output D3 of the frequency divider 11 and the output D4 of the frequency divider 21; more specifically, it is a wired OR gate. The detector/controller section 70 includes an integrator 71 for integrating the output GO of the gate circuit 60 and a comparator 72 for comparing the output voltage Vi of the integrator 71 with a reference voltage Vr, and the output CP of the comparator 72 is supplied to the OR gate 73. In this instance, provision is made for obtaining the output GO of the gate circuit 60 at an ECL (emitter-coupled logic) level which has a low level of −1.6 V and a high level of −0.8 V, and the reference voltage Vr is set to −1.0 V.

When the clock CL is normal and the frequency dividers 11 and 21 are uniform in their frequency dividing phases as mentioned previously, the outputs D3 and D4 of the frequency dividers 11 and 21 are in-phase pulse signals of the 50% duty ratio and the duty ratio of the output GO of the gate circuit 60 is also 50%, as shown in FIG. 5. Consequently, the output voltage Vi of the integrator 71 becomes −1.2 V, just intermediate between the above-mentioned voltages −1.6 V and −0.8 V; namely, the voltage Vi becomes lower than the reference voltage Vr which is −1.0 V as mentioned above, and the output CP of the comparator 72 goes low and no reset signal is developed.

Figure 6:
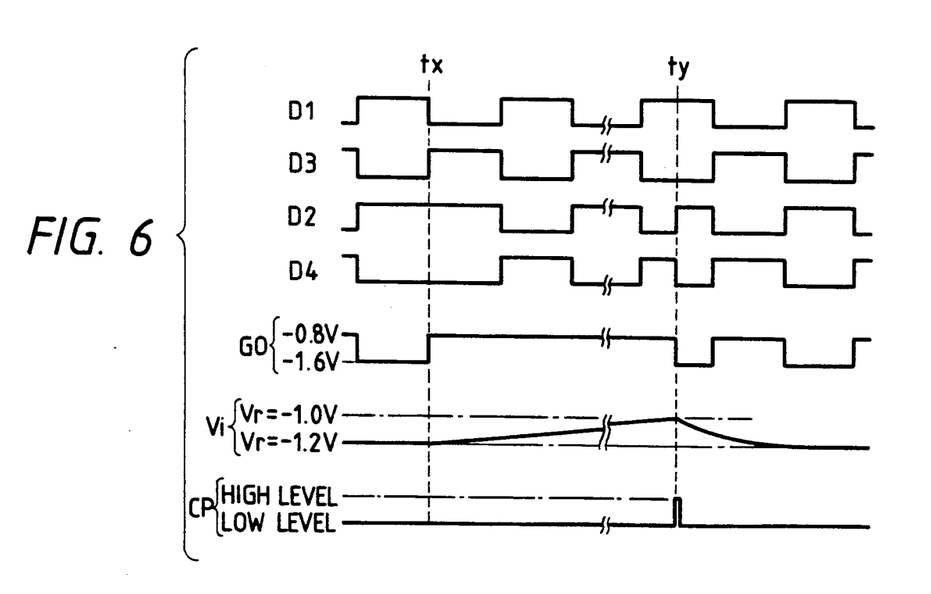
FIG. 6 is a timing chart for explaining its abnormal operation.

Now, let it be assumed that abnormalities in the clock CL and the outputs D5 and D6 of the frequency dividers 31 have caused, for example, the frequency divider 21 to be lower in response speed than the frequency divider 11 and hence have made their frequency dividing phases nonuniform, resulting in the order of multiplexing of the input pattern data I1 to I4 in the final output pattern data O3 becoming different from a predetermined order. In this instance, as shown in FIG. 6, the outputs D3 and D4 of the frequency dividers 11 and 21 become 180° out-of-phase pulse signals each having a duty ratio of 50% and the duty ratio of the output GO of the gate circuit 60 becomes 100% at and after a time point tx when the above-mentioned abnormalities occurred, and consequently, the output voltage Vi of the integrator 71 gradually increase toward −0.8 V. At a time point ty when the voltage Vi exceeds −0.1 V, the output CP of the comparator 71 goes high, producing a reset signal. The reset signal is applied via the OR gate 73 to the frequency dividers 11, 21 and 31 to reset them. Thus, after the time point ty the frequency dividers 11 and 21 are uniform in their frequency dividing phases and the order of multiplexing of the input pattern data I1 through I4 in the output pattern data O3 is as predetermined. In practice, the output CP of the comparator 72 is provided in synchronism with the clock CL by use of, for example, a D flip-flop which is triggered by the clock CL, though not shown. In consequence, the reset signal from the detector/controller section 70 is synchronized with the clock CL.

Figure 4A:
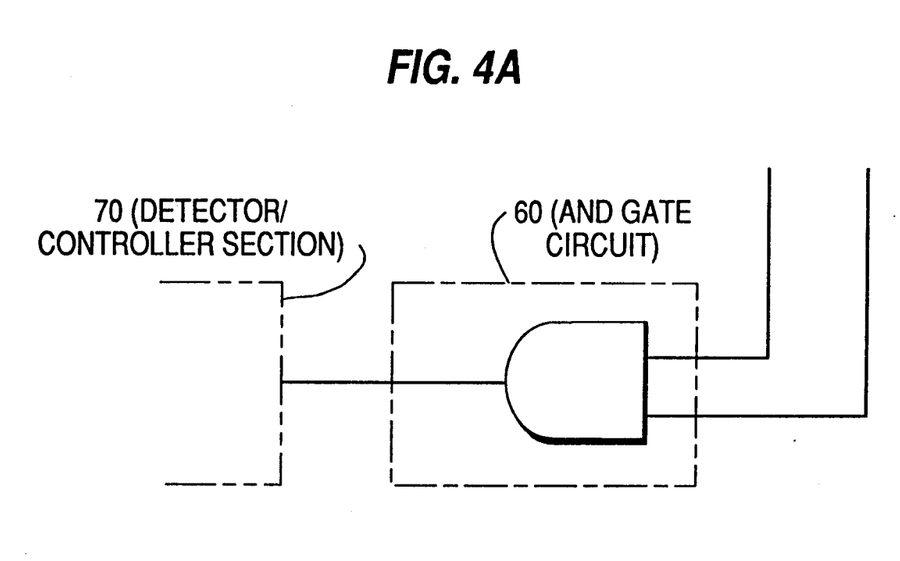
FIG. 4A is an AND circuit which can be used in FIG. 4.

The gate circuit 60 may also be, for example, an AND gate for ANDing the outputs D3 and D4 of the frequency dividers 11 and 21, as shown in FIG. 4A. In this case, however, the duty ratio of the output GO from the gate circuit 60 becomes 50% under normal conditions but 0% under abnormal conditions. In view of this, the reference voltage Vr is set to a voltage intermediate between the output voltage of the integrator 71 when the duty ratio of the output GO from the gate circuit 60 is 50% and the output voltage of the integrator 71 when the duty ratio of the output GO from the gate circuit 60 is 0%. By this, the comparator 72 provides the reset signal at the output CP when the output voltage Vi of the integrator 71 becomes lower than the reference voltage Vr.

This embodiment may also employ an arrangement in which the gate circuit 60 obtains the OR or AND of the non-inverted logic output D3 of the frequency divider 11 and the inverted logic output D2 of the frequency divider 21. During normal operation the outputs D3 and D2 of the frequency dividers 11 and 21 are 180° out-of-phase pulse signals of the 50% duty ratio and during abnormal operation they are in-phase pulse signals of the 50% duty ratio. Hence, during normal operation the OR output of the outputs D3 and D2 of the frequency dividers 11 and 21 has a duty ratio of 100%, whereas during abnormal operation the OR output has a duty ratio of 50%. On the other hand, the AND output is 0% in duty ratio during normal operation and 50% during abnormal operation. In the case of using the OR of the outputs D3 and D2 of the frequency dividers 11 and 21, it is necessary only to set the reference voltage Vr to a value intermediate between the output voltage of the integrator 71 when the duty ratio of the output GO from the gate circuit 60 is 50% and the output voltage of the integrator 71 when the duty ratio of the output GO is 100%, by which the reset signal is provided at the output CP of the comparator 72 when the output voltage Vi of the integrator 71 becomes lower than the reference voltage Vr. In the case of using the AND of the outputs D3 and D2, the reference voltage Vr is set to a value intermediate between the output voltage of the integrator 71 when the duty ratio of the output GO from the gate circuit 60 is 0% and the output voltage of the integrator 71 when the duty ratio of the output GO is 50%, by which the reset signal is provided at the output CP of the comparator 72 when the output voltage Vi of the integrator 71 becomes higher than the reference voltage Vr.

Table I shows combinations of signals and gate 60 outputs which are used for the abnormality detection and control described above with respect to FIG. 4.

TABLE I

| SIGNALS | GATE 60 | NORMAL | ABNORMAL | REFERENCE Vr | OUTPUT |
|---------|---------|--------|----------|--------------|--------|
| D3, D4  | OR      | 50%    | 100%     | $-1.2V<Vr<-0.8V$ | CP |
|         | AND     | 50%    | 0%       | $-1.6V<Vr<-1.2V$ | $\overline{CP}$ |
| D2, D3  | OR      | 100%   | 50%      | $-1.2V<Vr<-0.8V$ | $\overline{CP}$ |
|         | AND     | 50%    | 50%      | $-1.6V<Vr<-1.2V$ | CP |

In Table I the column NORMAL shows the duty ratio of the output GO from the gate circuit 60 when the frequency dividers 11 and 21 are normal in operation and the column ABNORMAL shows the duty ratio of the OUTPUT GO when the frequency dividers 11 and 21 are abnormal in operation. The column REFERENCE indicates the range of selection of the reference voltage Vr. In the column OUTPUT, CP indicates that the output CP of the comparator 72 is applied intact to the OR gate 73 by the construction of the detector/controller section, whereas $\overline{CP}$ indicates that the output CP of the comparator 72 is applied to the OR gate 73 after being inverted or that the inputs Vi and Vr to the comparator 72 are exchanged with each other.

Figure 7:
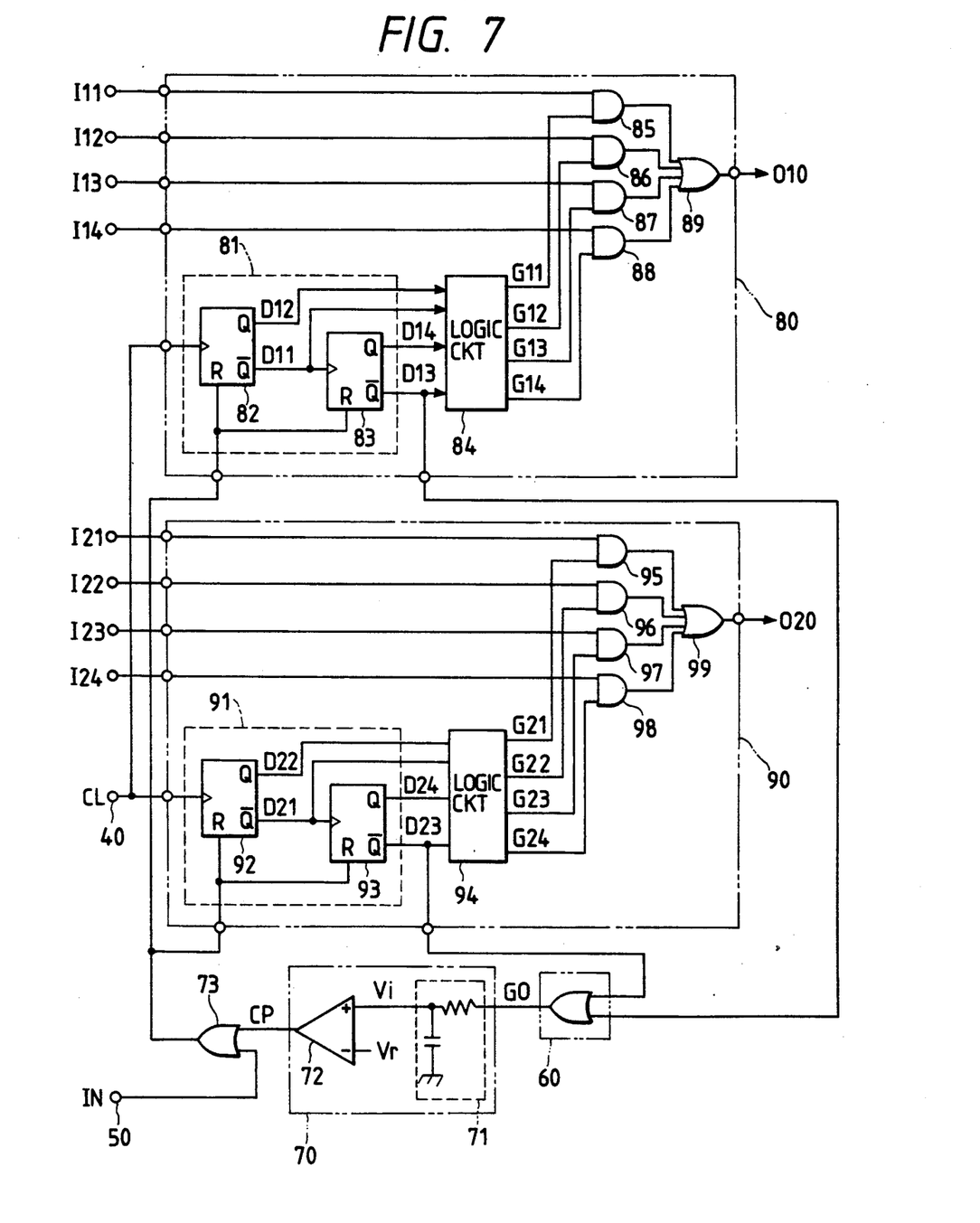
FIG. 7 is a circuit diagram illustrating another example of the data multiplexing device of the present invention.

FIG. 7 illustrates another embodiment of the data multiplexing device of the present invention.

Figure 8:
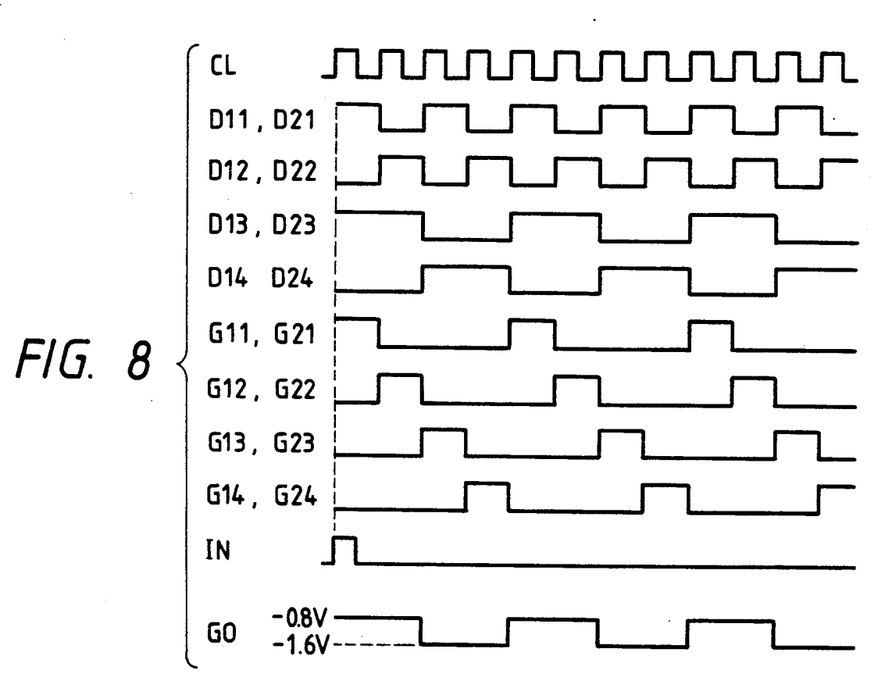
FIG. 8 is a timing chart for explaining a normal operation of the multiplexing device depicted in FIG. 7.

This embodiment includes two data multiplexing circuits 80 and 90 which multiplex, on a time-shared basis, four-channel input pattern data I11 through I14 and I21 through I24 having a rate ¼ that of the clock CL available at the terminal 40. The data multiplexing circuit 80 includes, as a frequency divider 81, a ¼ frequency divider composed of two T flip-flops 82 and 83. The clock CL is applied to a trigger terminal of the T flip-flop 82, the output D11 of the T flip-flop 82 is applied to a trigger terminal of the T flip-flop 83, the outputs D11 and D12 of the T flip-flop and the outputs D13 and D14 of the T flip-flop 83 are provided to a logic circuit 84, from which are obtained gate signals G11 through G14 which divide the bit width of the input pattern data I11 to I14 into four parts as shown in FIG. 8. The gate signals G11 to G14 and the input pattern data I11 to I14 are applied to AND gates 85 to 88, the outputs of which are provided to an OR gate 89. The data multiplexing circuit 90 is also exactly identical in construction with the data multiplexing circuit 80. The initial reset signal IN is applied from the terminal 50 to the T flip-flops 82 and 83 of the frequency divider 81 and T flip-flops 92 and 93 of a frequency divider 91 via the OR gate 73.

When the clock CL is normal and the frequency dividers 81 and 91 are uniform in their frequency dividing phases, the clock CL, the outputs D11 and D12 of the T flip-flop 82, the outputs D13 and D14 of the T flip-flop 83, the gate signals G11 through G14, the outputs D21 and D22 of the T flip-flop 92, the outputs D23 and D24 of the T flip-flop 93, the gate signals G21 through G24 and the initial reset signal IN bear such relations as shown in FIG. 8. In this instance, the data multiplexing circuits 80 and 90 provide their output pattern data O10 and O20 in which input pattern data I11 to I14 and I21 to I24 have been multiplexed on the time-shared basis in interrelated predetermined orders, respectively.

This embodiment also includes the gate circuit 60 and the detector/controller section 70. The gate circuit 60 is, for example, an OR gate for ORing the outputs D13 and D23 of the frequency dividers 81 and 91 which operate concurrently; more specifically, it is a wired OR gate. In this instance, provision is made for obtaining the output GO of the gate circuit 60 at the ECL level which has a low level of $-1.6$ V and a high level of $-0.8$ V, and the reference voltage Vr in the detector/controller section 70 is set to $-1.1$ V.

When the clock CL is normal and the frequency dividers 81 and 91 are uniform in their frequency dividing phases as mentioned above, the outputs D13 and the D23 of the frequency dividers 81 and 91 are in-phase pulse signals having a duty ratio of 50% and the duty ratio of the output GO from the gate circuit 60 is 50% as shown in FIG. 8. Hence, the output voltage Vi of the integrator 71 becomes $-1.2$ V just intermediate between the above-mentioned voltages $-1.6$ and $-0.8$ V; namely, the voltage Vi becomes lower than the reference voltage Vr which is $-1.1$ V as referred to above. Consequently, the output CP of the comparator 72 goes low and no reset signal is yielded at the output CP.

Figure 9A:
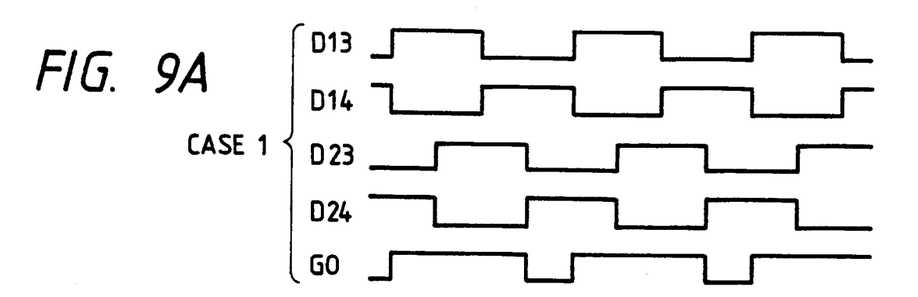
FIG. 9A is a timing chart for explaining one state of nonuniformity in frequency dividing phases.
Figure 9B:
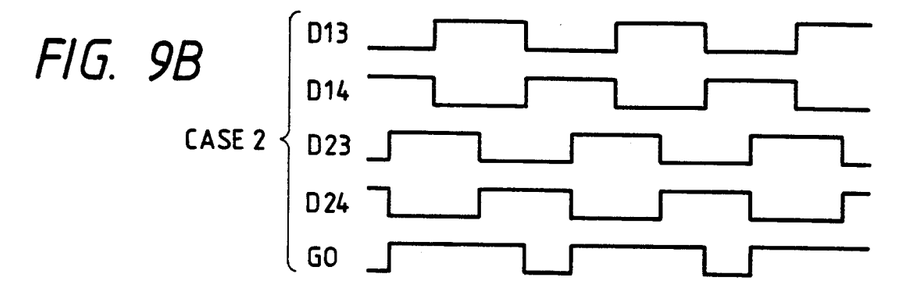
FIG. 9B is a timing chart for explaining another state of nonuniformity in frequency dividing phases.
Figure 9C:
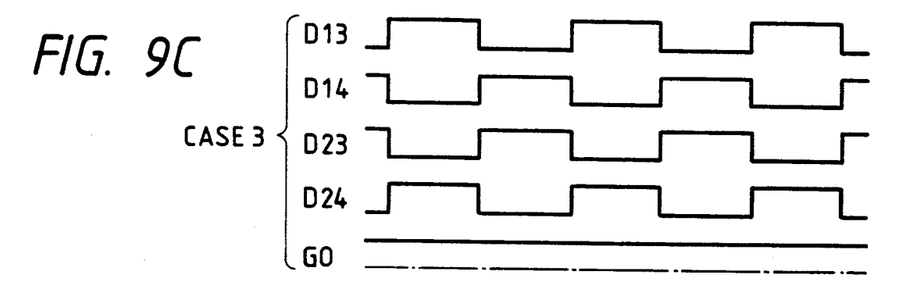
FIG. 9C is a timing chart for explaining still another state of nonuniformity in frequency dividing phases.

On the other hand, in the case where the frequency dividing phases of the frequency dividers 81 and 91 are not the same owing to the difference in response between their T flip-flops 82 and 92, caused by an abnormality in the clock CL, the outputs D13 and D23 of the frequency dividers 81 and 91 are shifted 90° (i.e. one period of the clock CL) apart and the duty ratio of the output GO from the gate circuit 60 becomes 75% as shown in CASE 1 of FIG. 9A or CASE 2 of FIG. 9B, or the outputs D13 and D23 of the frequency dividers 81 and 91 become 180° out-of-phase with each other and the duty ratio of the output GO becomes 100% as shown in CASE 3 of FIG. 9C. Consequently, in CASE 1 or 2 the output voltage Vi of the integrator 71 gradually rises toward $-1.0$ V and at the time point when the voltage Vi becomes higher than $-1.1$ V, the reset signal is developed at the output CP of the comparator 72 and is applied to the frequency dividers 81 and 91 to reset them. In CASE 3 the output voltage Vi of the integrator 71 gradually rises toward $-0.8$ V, and at the time point when the voltage Vi exceeds $-1.1$ V, the comparator 72 yields the reset signal at the output CP, which is applied to the frequency dividers 81 and 91 to reset them.

The gate circuit 60 may also be, for example, an AND gate which ANDs the outputs D13 and D23 of the frequency dividers 81 and 91. In this instance, however, the output GO of the gate circuit 60 has a duty ratio of 50% during normal operation but 25 or 0% during abnormal operation. Hence, the reference voltage Vr is set to a value intermediate between the output voltage of the integrator 71 when the duty ratio of the output GO from the gate circuit 60 is 50% and the output voltage of the integrator 71 when the duty ratio of the output GO is 25%, by which the comparator 72 provides the reset signal at the output CP when the output voltage Vi of the integrator 71 becomes lower than the reference voltage Vr.

This embodiment may also be constructed so that, for example, the inverted logic output D13 of the frequency divider 81 and the non-inverted logic output D24 of the frequency divider 91 are ORed or ANDed with each other by the gate circuit 60. The outputs D13 and D24 of the frequency dividers 81 and 91 become 180° out-of-phase with each other during normal operation as shown in FIG. 8 and during abnormal operation they are shifted 90° apart or in-phase with each other as shown in CASE 1, 2 or 3 of FIGS. 9A, 9B and 9C. Consequently, the OR output of the outputs D13 and D24 of the frequency dividers 81 and 91 has a duty ratio of 100% during normal operation, but during abnormal operation the OR output has a duty ratio of 75 or 50%. The AND output has a duty ratio of 0% during normal operation but 25 or 50% during abnormal operation. Hence, in the case of ORing the outputs D13 and D24 of the frequency dividers 81 and 91, the reference voltage Vr is set to a value intermediate between the output voltage of the integrator 71 when the duty ratio of the output GO from the gate circuit 60 is 100% and the output voltage of the integrator 71 when the duty ratio of the output GO is 75%, and provision is made for obtaining the reset signal at the output CP of the comparator 72 when the output voltage Vi of the integrator 71 becomes lower than the reference voltage Vr. In the case of obtaining the AND of the outputs D13 and D24, the reference voltage Vr is set to a value intermediate between the output voltage of the integrator 71 when the duty ratio of the output GO from the gate circuit 60 is 0% and the output voltage of the integrator 71 when the duty ratio of the output GO is 25% so that the comparator 72 may provide the reset signal at the output CP when the output voltage Vi of the integrator 71 exceeds the reference voltage Vr.

Table II given below shows combinations of signals and types of gate 60 which are used for the abnormality detection and control described above in respect of FIG. 7.

TABLE II

| SIGNALS | GATE 60 | NORMAL | ABNORMAL | REFERENCE Vr | OUTPUT |
|---|---|---|---|---|---|
| D13, D23 | OR | 50% | 75 or 100% | $-1.2V < Vr < -1.0V$ | CP |
| | AND | 50% | 25 or 0% | $-1.4V < Vr < -1.2V$ | $\overline{CP}$ |

TABLE II-continued

| SIGNALS | GATE 60 | NORMAL | ABNORMAL | REFERENCE Vr | OUTPUT |
|---------|---------|--------|----------|--------------|--------|
| D13, D24 | OR | 100% | 75 or 50% | $-1.0V < Vr < -0.8V$ | $\overline{CP}$ |
|  | AND | 0% | 25 or 50% | $-1.6V < Vr < -1.4V$ | CP |

The meanings of the columns in the above table are the same as those in Table I.

Needless to say, the present invention is applicable as well to the case where three or more data multiplexing circuits such as those identified by 80 and 90 are employed. In such an instance, however, it is necessary to obtain the OR or AND of the outputs of respective frequency dividers which ought to be in-phase with each other, such as the OR or AND of the outputs D13 and D23 or D14 and D24 of the frequency dividers 81 and 91 in the above-described embodiment which includes the two data multiplexing circuits 80 and 90.

Figure 10:
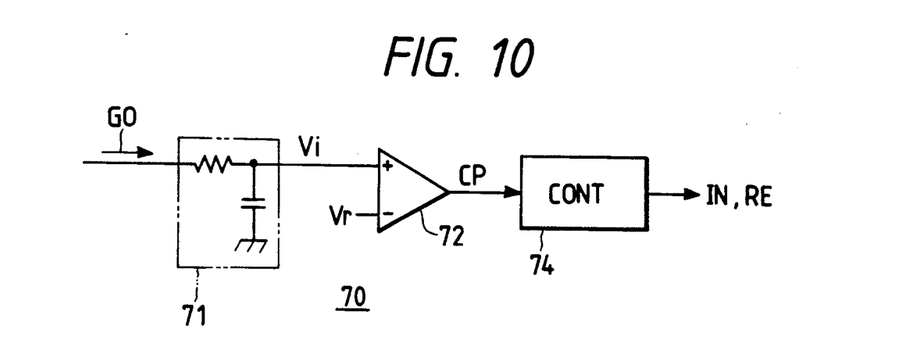
FIG. 10 is a circuit diagram illustrating a portion of still another example of the data multiplexer of the present invention.

FIG. 10 illustrates a modified form of the detector/controller section 70, in which the initial reset signal IN is obtained from a control circuit 74 and a reset signal RE is also obtained from the control circuit 74 when the output CP of the comparator 72 is applied thereto and goes high. Of course, in this case the frequency dividers of the data multiplexing circuits are not reset and the output CP is held high until the reset signal RE is provided from the control circuit 74 after the output CP has gone high.

As described above, the present invention ensures, with a simple construction, the detection of a disturbance in the order of multiplexing of input data which is caused by lack of uniformity in the frequency dividing phases of frequency dividers between data multiplexing circuits and automatically corrects the frequency dividing phases to perform the multiplexing of the input data in a predetermined order.

It will be apparent that many modifications and variations may be effected without departing from the scope of the novel concepts of the present invention.

What is claimed is:

1. A data multiplexing device comprising:
   a plurality of data multiplexing circuits each including a frequency divider for frequency dividing a common clock and a logic circuit means for multiplexing input data of a plurality of channels on a time-shared basis by the use of the output of said frequency divider;
   a gate circuit for performing a logical operation of the outputs of said frequency dividers of said plurality of data multiplexing circuits; and
   a detector/controller section for detecting whether or not a voltage corresponding to the duty ratio of the output from said gate circuit has deviated from a predetermined reference voltage in a predetermined direction and, when said voltage has deviated from said predetermined reference voltage in said predetermined direction, a reset signal is generated for resetting said frequency dividers of said plurality of data multiplexing circuits.

2. The data multiplexing device of claim 1, wherein said detector/controller section includes an integrator for integrating the output of said gate circuit to output said voltage corresponding to said reference voltage and comparator means for comparing the output of said integrator with said reference voltage to generate said reset signal, based on the result of said comparison.

3. The data multiplexing device of claim 1, wherein said gate circuit includes an OR gate.

4. The data multiplexing device of claim 1, wherein said gate circuit includes an AND gate.

5. The data multiplexing device of claim 1, wherein said gate circuit is an emitter-coupled logic circuit.

6. The data multiplexing device of claim 2, wherein said gate circuit includes an OR gate.

7. The data multiplexing device of claim 2, wherein said gate circuit includes an AND gate.

8. The data multiplexing device of claim 2, wherein said gate circuit is an emitter-coupled logic circuit.

* * * * *

UNITED STATES PATENT AND TRADEMARK OFFICE
CERTIFICATE OF CORRECTION

PATENT NO. : 5,239,546
DATED : AUGUST 24, 1993
INVENTOR(S) : MISHIO HAYASHI

It is certified that error appears in the above-indentified patent and that said Letters Patent is hereby corrected as shown below:

```
Col. 6 (TABLE 1), line 5, under the column "Normal",
          the last entry (D2, D3/AND)

"50%" should be --0%--.
```

Signed and Sealed this

Twenty-second Day of March, 1994

Attest:

BRUCE LEHMAN

Attesting Officer    Commissioner of Patents and Trademarks